July 26, 1960   J. S. HUTCHISON ET AL   2,946,643
CLIPPED TRACE RECORDING OF ELECTRICAL SIGNALS
Filed Feb. 15, 1956   2 Sheets-Sheet 1
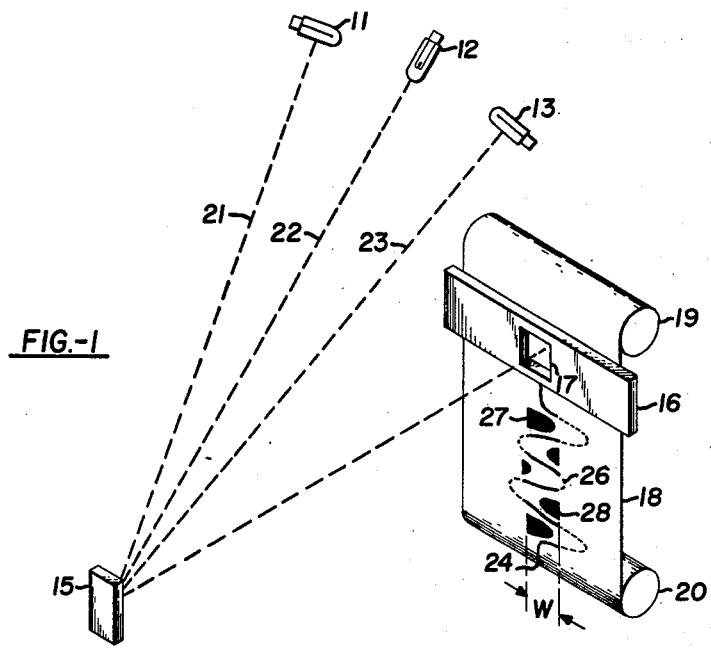
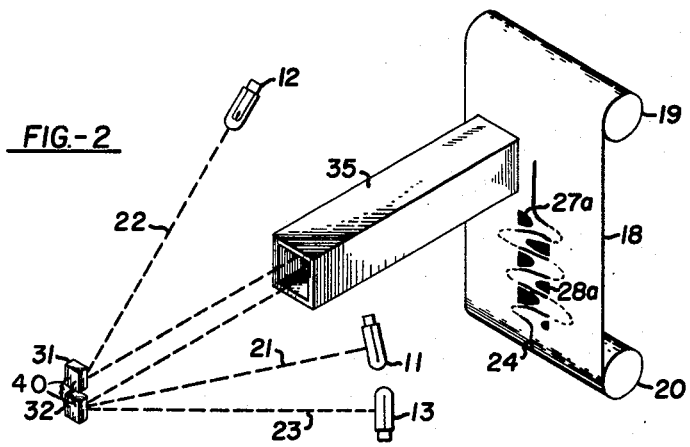
John S. Hutchison
Alexander B. Hildebrandt   Inventors
By   B. O. Dimmick   Attorney July 26, 1960 J. S. HUTCHISON ET AL 2,946,643
CLIPPED TRACE RECORDING OF ELECTRICAL SIGNALS
Filed Feb. 15, 1956 2 Sheets-Sheet 2

John S. Hutchison
Alexander B. Hildebrandt   Inventors

By  R. B. Dimmick  Attorney

United States Patent Office 2,946,643
Patented July 26, 1960

2,946,643

CLIPPED TRACE RECORDING OF ELECTRICAL SIGNALS

John S. Hutchison and Alexander B. Hildebrandt, Tulsa, Okla., assignors, by mesne assignments, to Jersey Production Research Company Filed Feb. 15, 1956, Ser. No. 565,621

8 Claims. (Cl. 346—1)

This invention concerns methods and apparatus for the photographic recording of electrical signals in the form of traces of a fixed maximum width. More particularly the invention relates to the recording of signals in the form of oscillograph-type traces in which the peaks and valleys of the traces are "clipped off" to give traces having a constant maximum width while the peaks and valleys that have been clipped off are restored within the space of the limited recording channel. The unclipped centers of the traces are of the conventional "wiggly trace" type while the reintroduced peaks and valleys are of the variable area type. The invention is particularly useful in the making of seismic records in geophysical exploration.

One method of geophysical exploration that has been in use for some time is that known as seismic prospecting. Briefly this method consists in initiating a seismic disturbance at a selected point on or adjacent the earth's surface and detecting reflected seismic waves at a plurality of points spread out in a selected pattern on the earth's surface. The seismic waves are detected with sensitive instruments known as seismometers or geophones which translate the detected motion into electrical impulses that are then fed to suitable amplifiers and recorded on a seismograph. By simultaneously providing the seismic record with suitable timing marks it is possible to determine from the record the length of time required for the arrival of seismic waves at each of the detection points, either directly through the earth from the seismic source or by reflection from subsurface strata. From these arrival times and from other data pertinent to the area being studied, such as seismic wave velocities in the various earth layers, it is then possible to calculate the depths of the reflecting substrata.

Oscillograph records of detected seismic waves obtained as just described when made in favorable areas may often be examined visually to pick out prominent reflections which will show up as similar transients that line up on the adjacent traces of the record. However, in many instances such reflections are difficult to distinguish because of the complexity of the wave forms. It has more recently been noted that if the detected impulses are recorded in the form of variable density photographic records many more reflections can often be noted. Such variable density traces have the advantage that since they are of uniform width without any overlapping between adjacent traces it is possible to compute corrections for each of the traces to convert the arrival times of the recorded impulses to a common datum and then shift each trace lengthwise with respect to the other traces to thereby incorporate the computed time corrections and thus obtain a more accurate line up between the traces. Variable density records have the disadvantage, however, that much of the amplitude information is lost and such amplitude information is often desirable when conducting seismic studies. It has therefore been appreciated that a need exists for a method and system for seismic recording that will preserve the amplitude of the recorded signals while at the same time furnishing the advantage of non-overlapping traces. It is one object of the present invention to provide such a method and apparatus.

In accordance with the present invention a conventional seismic recording apparatus is modified by placing in the path of reflected light from the galvanometer an apertured light barrier so as to limit the extent of the recording channel. In addition to the conventional single point source of light two line sources of light are provided. In the at-rest position of the galvanometer and for small amplitudes of swing the galvanometer reflects into the channel the light beam from the point source of light. For larger amplitudes of swing the point beam of light is prevented from passing through the aperture and instead one of the beams from the line source of light passes through the aperture, thereby producing a combination of a variable area trace and a line trace, the variable area portions representing the peaks and valleys of the conventional trace. In a modification of the invention two galvanometers are employed, one being of high sensitivity to record the center of the trace and the other being a lower sensitivity galvanometer that records the peaks and valleys.

The nature and objectives of the invention and the manner in which the apparatus of the invention is constructed and used will be readily apparent when reference is made to the ensuing description and the accompanying drawings in which:

Figure 1 is a schematic diagram of one embodiment of the invention utilizing a single galvanometer to record both the clipped trace and the variable area peaks and valleys;

Figure 2 is a similar schematic diagram showing another embodiment of the invention wherein a high sensitivity galvanometer is used to record the center clipped trace and a lower sensitivity galvanometer is used to record the peaks and valleys;

Figure 3:
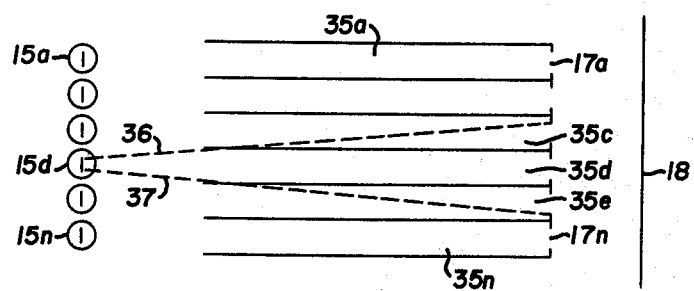
Figure 3 is a plan view showing how the invention may be adapted for multiple channel recording.

Referring now particularly to Figure 1 it will be seen that two line sources of light 11 and 13 are provided, arranged on either side of a point source of light 12. The line sources of light 11 and 13 may be line filament lamps, as shown, or they may be fluorescent tube lamps or lamps of a similar nature furnishing essentially uniform light along a considerable portion of their length. Likewise the point source of light 12 may be any small lamp that will supply a small concentrated spot of light. These three sources of light are so positioned with respect to the mirror of a galvanometer 15 that the beams from the light source will be reflected toward a light barrier 16 provided with a central aperture 17. Galvanometer 15 is of the conventional type used in seismograph recorders and has a mirror that rotates on a vertical axis in response to electrical voltages applied to the galvanometer. Arranged on the opposite side of the light barrier from the galvanometer is a photographically sensitive record chart 18 which may be conveniently carried on a pair of rollers 19 and 20 to move the record chart past the aperture at a predetermined rate of speed in a direction transverse to that of the swing of the galvanometer.

Because of the limiting aperture, either light beam 21 from light source 11, light beam 22 from light source 12 or light beam 23 from source 13 will pass through the aperture, depending on the rotational position of the galvanometer. The light sources 11 and 13 are so spaced from the light source 12 that as soon as the beam of light 22 from source 12 is cut off by the barrier either the beam 21 from light source 11 or beam 23 from light source 13 will pass through the aperture, depending on the direction of rotation. Additionally, light source 12 is so arranged that its light beam 22 will pass through the aperture when the galvanometer is in its at-rest position. The line trace 24 on the record chart which normally would continue into the peaks and valleys indicated by the dotted lines 26 is cut off by the light barrier, and the peaks and valleys that are thus cut off are recorded as the dark areas 27 representing the peaks and the dark areas 28 representing the valleys. Thus the entire amplitude of the trace is preserved while at the same time retaining all of the trace within the width W.

The arrangement shown in Figure 2 has the advantage of preserving the entire traces even though the amplitudes might exceed three times the width of the recording channel defined by the aperture. In the arrangement of Figure 2, two galvanometers are used, one galvanometer 31 having either a high sensitivity or a normal sensitvity and the other galvanometer 32 having a lower sensitivity than that of galvanometer 31. Electrical connections 40 connect galvanometer 31 and galvanometer 32. As a practical example, galvanometer 32 could have a sensitivity only one-half or one-fifth that of galvanometer 31. The two galvanometers are electrically connected in series so that they will deflect simultaneously with any given electrical signal fed to them. In place of the barrier and aperture arrangement of Figure 1, a light chute 35 is employed in the arrangement depicted in Figure 2, the opening through the chute serving as the aperture. The high sensitivity galvanometer 31 is arranged to reflect the beam 22 from the point light source 12 through the light chute and the lower sensitivity galvanometer 32 is arranged to reflect either of the beams 21 or 23 through the light chute.

Furthermore, the two galvanometers are so arranged with respect to the light source that when they are at their at-rest or zero positions galvanometer 31 will direct a beam from light source 12 through the light chute while neither of the light beams from sources 11 or 13 will be directed into the light chute by galvanometer 32. Then, as the galvanometers rotate, as soon as the beam 22 from the light source 12 no longer passes through the aperture at the end of the light chute, galvanometer 32 will reflect either light beam 21 from source 11 or the light beam 23 from source 13, through the light chute, depending on the direction of rotation of the galvanometers. Thus a trace of limited maximum width will be provided on the record chart in the same manner as in Figure 1 except that the variable area portions 27a and 28a will not have as steep a slope as the portions 27 and 28 shown in Figure 1. Stated in other words, the entire amplitude of a larger galvanometer swing can be recorded within the confines of a record channel in the arrangement of Figure 2 than is possible with the arrangement of Figure 1.

In Figure 3 is shown an arrangement wherein a plurality of traces can be recorded simultaneously side by side on the record chart. Figure 3 is a plan view and omits the light sources and the supporting rollers for the recording medium, which are out of the plane of that view. For convenience the multiple channel arrangement is shown embodying the type of recording depicted in Figure 1, that is, employing a single galvanometer for each trace, but using a plurality of chutes 35 of the type shown in Figure 2. A plurality of galvanometers 15a to 15n, are arranged in line and a separate aperture 17a to 17n is provided at the far end of each light chute 35a to 35n to correspond to each of the galvanometer mirrors 15a, etc., and thus define the width of each trace that is impressed on the photographic medium 18. To prevent the reflected light beams from any one of the mirrors from reaching an aperture other than its own, the length of the light shields or channels 35 must be sufficient to prevent any portion of the beam from a particular mirror from passing through the aperture of an adjacent channel. Thus the chute 35d, for example, must be of sufficient length to prevent light from mirror 15d from reaching the portions of chutes 35c and 35e within the dashed line ray paths 36 and 37, which lead to the extreme left edge of chute 35c and the extreme right edge of chute 35e. Preferably the interior surfaces of the light chutes 35 are provided with a black rough non-light-reflecting surface so that any light falling into adjacent channels will not find its way out through the apertures of those channels.

It will, of course, be understood that in each of Figures 1, 2, and 3 the spatial arrangements in an actual apparatus will not necessarily be the same as depicted in those figures since for clarity of illustration the spacings and sizes of the elements are not shown in true proportions. Likewise for clarity of illustration supporting structures have been omitted, as have additional opaque partitions or structures for preventing light from the light sources from reaching the photographic recording medium except through the proper apertures.

Figure 4:
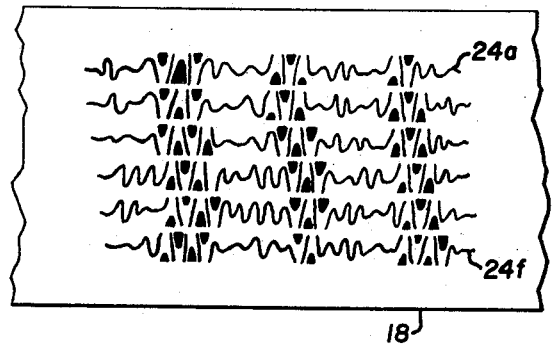
Figure 4 is a fragmentary view of a portion of a multiple channel record made with an arrangement of the type shown in Figure 3.

In Figure 4 is shown a fragmentary portion of a multiple channel record made with an arrangement of the type represented by Figure 3. Six traces, 24a to 24f, are shown in side-by-side relation, each being of the nature of the trace 24 of Figure 1. It will be noted that there is no overlapping between traces and yet the entire amplitude of the trace is preserved. At the same time the higher amplitude traces are emphasized by the dark variable area portions, thus aiding in visualizing line-ups on the record.

It is, of course, not intended that the invention be limited merely to the specific embodiments discussed and described herein as obvious modifications thereof which will occur to those skilled in the art will naturally fall within the scope of the invention. The invention is to be limited only by the following claims.

What is claimed is:

1. The method of recording an electrical signal in the form of a variable amplitude trace which comprises recording the central portion of the trace on either side of a zero base line position within an area on the recording medium of constant limited width as an oscillograph type trace and recording the more extreme amplitude portions of the trace as variable area traces within the same area on the recording medium of limited width.

2. An apparatus for recording a variable amplitude electrical signal which comprises in combination a reflecting-mirror galvanometer with its mirror rotationally responsive to said electrical signal, a photographic recording medium spaced from said mirror, a light barrier having an aperture disposed between said mirror and said photographic recording medium, means for moving said photographic recording medium past said aperture in said barrier, a point source of light spaced from said mirror with said mirror adapted to reflect a beam of light from said point source through said aperture to said photographic medium, a first line source of light spaced from said mirror adapted to reflect a line-shaped image of light from said mirror to said barrier and to one side of said aperture, a second line source of light spaced from said mirror adapted to reflect a second line-shaped image of light from said mirror to said light barrier and on an opposite side of said aperture from said first image, both of said images being substantially normal to the direction of movement of said medium, said mirror and said light sources being so arranged in a manner so that when the reflected beam from said point light source no longer passes through said aperture, the light beam from one of said line sources passes through said aperture.

3. Apparatus for recording an electrical signal varying in amplitude to both sides of a neutral value which comprises in combination a photographic recording medium; a light barrier having an aperture disposed adjacent said medium; a point source of light; two line sources of light; a reflecting-mirror galvanometer with its mirror rotationally responsive to amplitude variations in said electrical signal; said mirror, said point source of light and said barrier being spaced from one another and adapted to reflect a beam of light from said point source through said aperture to said photographic recording medium for rotational positions of said mirror corresponding to amplitude variations in said electrical signal having less than a predetermined value; a first of said line sources of light, said mirror and said barrier being spaced from one another to reflect a line-shaped image of said first line source through said aperture to said medium for rotational positions of said mirror corresponding to amplitude variations in said electrical signal exceeding said predetermined value to one side of said neutral value; said second line source of light, said mirror and said barrier being spaced from one another to reflect a line-shaped image of said second line source through said aperture to said medium for rotational positions of said mirror corresponding to amplitude variations in said electrical signal greater than said predetermined value to the opposite side of said neutral value; and means for moving said photographic recording medium relative to the aperture in said barrier in a direction normal to both line-shaped images.

4. An apparatus for recording an electrical signal which varies in amplitude with time which comprises in combination a photographic recording medium, a reflecting-mirror galvanometer with its mirror rotationally responsive to the variations in said signal, a light barrier with an aperture positioned between said mirror and said medium, means to move said medium past said aperture in a predetermined direction, a point source of light, said mirror in a neutral rotational position corresponding to a neutral value of said signal being adapted to reflect an image of said point source through said aperture to said medium, a first line source of light, said mirror in said neutral position being adapted to reflect an image of said first line source to said barrier on one lateral side of said aperture and with the image lying in a direction substantially normal to the movement of said medium, a second line source of light, said mirror being adapted in said neutral position to reflect an image of said second line source to said barrier on the opposite lateral side of said aperture with the image lying in a direction substantially normal to the movement of said medium and co-linear with the image of said first line source.

5. The method of recording an electrical signal which varies in amplitude with time about a neutral value which comprises recording the electrical signal in the form of a variable amplitude trace on a photographic recording medium within an area of constant limited width, clipping portions of the trace which exceed a predetermined amplitude on each side of the neutral value of the trace, recording portions of the electrical signal which exceed a predetermined amplitude in one direction from said neutral value as a variable area trace on one side of the variable amplitude trace and within the same channel of limited width, recording portions of the electrical signal which exceed a predetermined amplitude value in an opposite direction from said neutral value as a second variable area trace on the other side of the neutral value of the variable amplitude trace and within the same channel of limited width.

6. An apparatus for recording an electrical signal varying in sign and amplitude with time which comprises in combination; means to record the signal as a variable amplitude trace on a photographic recording medium, clipping means to selectively record only those portions of the signal as a variable amplitude trace which have a value less than a predetermined amplitude, first variable area recording means responsive to positive amplitude values of said electrical signal exceeding a predetermined value to form a first variable area photographic trace on said recording medium to one lateral side of said variable amplitude trace, second variable area recording means responsive to negative amplitudes of said electrical signal exceeding a predetermined value to form a second variable area trace on the recording medium and on the opposite lateral side of said variable amplitude trace from said first variable area trace.

7. An apparatus for recording a variable amplitude electrical signal which comprises in combination a first reflecting mirror galvanometer with its mirror rotationally responsive to said electrical signal, a second reflecting mirror galvanometer electrically connected to rotate simultaneously with said first galvanometer in response to the same electrical signal, a photographic recording medium spaced from said mirrors, a light barrier having an aperture disposed between said mirrors and said photographic recording medium, means for moving said photographic recording medium past said aperture in said barrier, a point source of light spaced from said first mirror with said first mirror adapted to reflect a beam of light from said point source through said aperture to said photographic medium, a first line source of light spaced from said second mirror with said second mirror adapted to reflect a line shaped image of light from said second mirror to said barrier into one side of said aperture, a second line source of light spaced from said second mirrow adapted to reflect a second line shaped image of light from said second mirror and on an opposite side of said aperture from said first image both of said images being substantially normal to the direction of movement of said medium.

8. An apparatus as defined by claim 1, including an elongated open ended chute between said recording medium and said mirror with said aperture being at one end of said chute.

References Cited in the file of this patent
UNITED STATES PATENTS

| | | |
|---|---|---|
| 1,838,389 | Goldberg | Dec. 29, 1931 |
| 1,907,549 | Kahrs | May 9, 1933 |
| 2,258,700 | Doll | Oct. 14, 1941 |
| 2,415,880 | Hassler | Feb. 18, 1947 |
| 2,769,683 | Skelton | Nov. 6, 1956 |

FOREIGN PATENTS

| | | |
|---|---|---|
| 394,328 | Great Britain | June 16, 1933 |